United States Patent

[11] 3,606,998

| [72] | Inventors | George H. La Porte;<br>Cherie A. La Porte, both of P.O. Box 12,<br>Steamboat, Nev. 89436 |
|---|---|---|
| [21] | Appl. No. | 13,024 |
| [22] | Filed | Feb. 20, 1970 |
| [45] | Patented | Sept. 21, 1971 |

[54] ROOM FRESHENER AND DEODORIZER
4 Claims, 2 Drawing Figs.

[52] U.S. Cl. ................................................ 21/74,
55/35, 55/74, 55/278, 55/279, 55/358, 55/387,
55/418, 55/472, 55/473, 55/512
[51] Int. Cl. .................................................. A61l 9/00
[50] Field of Search ..................................... 21/53, 55,
74; 55/387, 472, 473, 418, 278, 279, 35, 74, 358,
512

[56] References Cited
UNITED STATES PATENTS

| 1,960,260 | 5/1934 | Acton | 55/418 X |
| 1,992,586 | 2/1935 | Tobin | 55/278 X |
| 2,091,353 | 8/1937 | Downs | 55/35 X |
| 2,362,933 | 11/1944 | Schaefer | 21/55 X |
| 2,469,842 | 5/1949 | Paquin et al. | 55/387 |
| 2,640,558 | 6/1953 | Dauphinee | 55/387 |
| 2,642,951 | 6/1953 | Norton | 55/387 X |
| 3,246,453 | 4/1966 | Becker | 55/418 X |

FOREIGN PATENTS

| 13,034 | 7/1903 | Great Britain | 55/462 |
| 1,005,431 | 12/1951 | France | 55/387 |
| 1,373,706 | 8/1964 | France | 55/512 |

*Primary Examiner*—Morris O. Wolk
*Assistant Examiner*—Joseph T. Zatarga
*Attorney*—Lothrop & West

ABSTRACT: A box has three compartments. The first is an air intake compartment with a blower to drive stale polluted atmospheric air into an adjacent air transfer compartment. Separating the second, air-transfer compartment from the third compartment is a perforated wall with openings large enough for the passage of air but small enough to confine granular diatomaceous earth in the third compartment. The air-transfer compartment is intermediate the first and third compartments and is bounded by lateral sidewalls having holes therein so that stale, polluted air emerging from the blower, passing through the second compartment into the diatomaceous earth-containing compartment for the absorption of odors and returning into the second compartment is free to discharge through the holes in freshened and deodorized condition.

PATENTED SEP 21 1971

3,606,998

INVENTORS
GEORGE H. LaPORTE
CHERIE A. LaPORTE

BY

Lothrop & West
ATTORNEYS

ROOM FRESHENER AND DEODORIZER

The invention relate to improvements in devices for freshening, dehumidifying and deodorizing air, particularly in spaces wherein the air tends to become damp and stale, such as in refrigerators, walk-in boxes, coolers, rooms, lockers, closets and the like.

The market place as well as the patent literature afford many examples of devices purporting to remove unwanted moisture and odors from living and storage spaces. For the most part, however, the devices heretofore available have either been unduly complex and expensive, or have been of such a rudimentary nature as to be ineffective for the purpose intended.

It is therefore an object of the invention to provide a room freshener and deodorizer which is not only economical and compact but which is efficient in the removal of atmospheric moisture and odors.

It is another object of the invention to provide an air deodorizer and freshener which is portable, has but a minimum of moving parts to get out of order and is readily adaptable to a wide variety of conditions and environments.

It is a further object of the invention to provide a generally improved room freshener and deodorizer.

Other objects, together with the foregoing, are attained in the embodiment described in the following description and illustrated in the accompanying drawing, in which.

Figure 1:
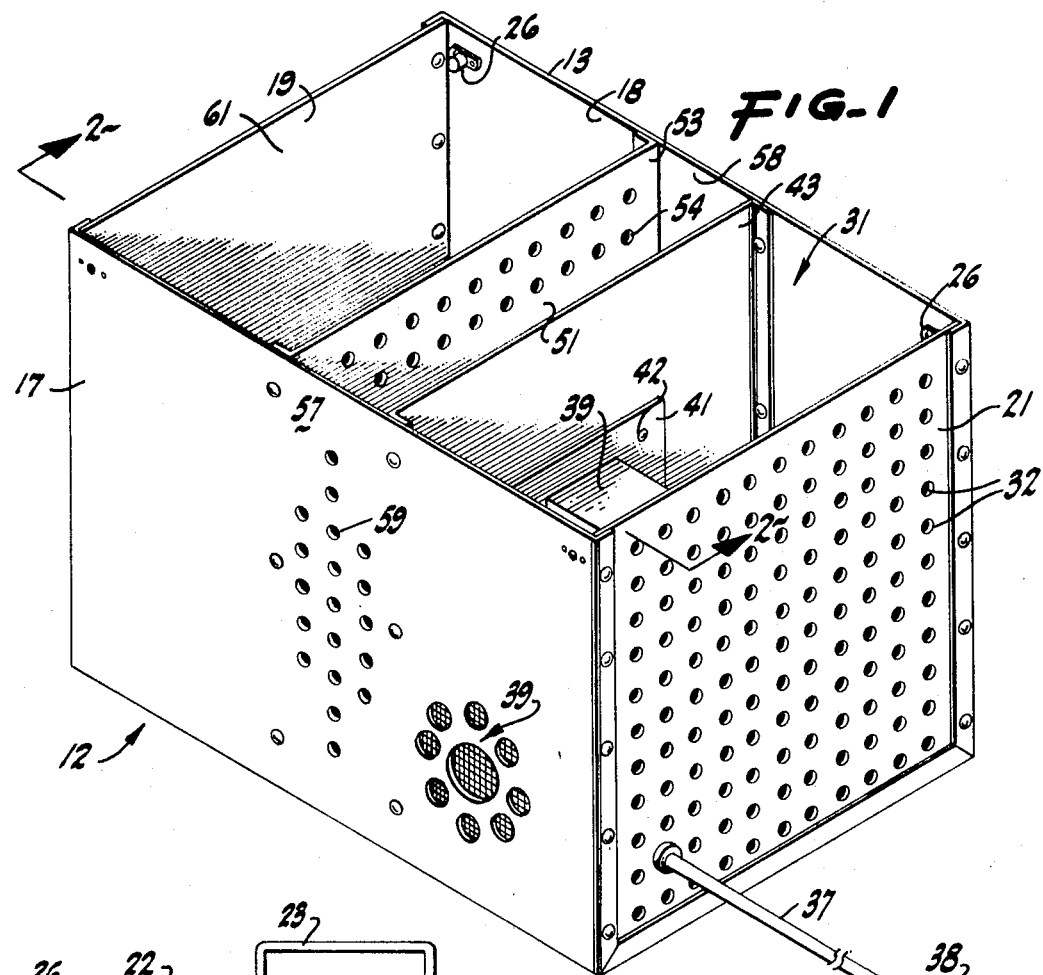
FIG. 1 is a perspective view.

While the room freshener and deodorizer of the invention is susceptible of numerous physical embodiments, depending on the environment and requirements of use, substantial numbers of the herein shown and described embodiment have been made, tested and used, and all have performed in an eminently satisfactory manner.

The room freshener and deodorizer of the invention, generally designated by the reference numeral 12, comprises a suitably dimensioned box 13, or housing, including a bottom 14 supported by legs 16, a pair of opposite, lateral, sidewalls 17 and 18, an imperforate end wall 19, and an opposite, perforate end wall 21.

A top closure 22 with a foldable carrying handle 23 is removably attachable to the box structure by appropriate fastenings 26.

The interior of the box 13 is divided into three compartments, or chambers, by transverse partitions, each of the compartments being arranged to afford a particular result.

The first compartment is designated by the reference numeral 31 and is termed an air intake compartment. The air intake compartment 31 receives atmospheric air through the perforations 32 in the end wall 21 in the flow pattern generally indicated by the arrows 33 in FIG. 2.

As will be understood, the atmospherical is drawn into the intake 31 by a blower 34 driven by an electric motor 36 connected by a conductor 37 to a plug 38 attachable to a suitable electrical energy source, now shown. A screened, rosette type of opening 39 in the sidewall 17 affords cooling air for the motor.

The blower scroll casing includes an outlet conduit 40 formed with flanges 41 secured by fastenings 42 to a transverse, blower-mounting partition 43 having a central opening 44 in registry with the conduit exhaust 40.

Thus, atmospheric air which is stale, moisture laden, polluted with visible or invisible particles, odors and the like, is drawn through the perforations 32 in the perforate end wall 21, in the flow paths indicated by the arrows 33, and enters the blower 34. Upon emerging from the blower conduit 40 and passing through the partition opening 44, the stale air enters a middle compartment termed an air transfer compartment, designated by the reference numeral 51.

The air transfer compartment 51 is bounded on one end by the mounting wall 43 and on the other end by a perforated partition 53 containing a plurality of perforations 54.

Laterally, the air transfer compartment 51 is defined by the adjacent, lateral, sidewall portions 57 and 58, respectively, of the box sidewalls 17 and 18.

The sidewall portions 57 and 58 are both provided with a plurality of holes 59 for a purpose subsequently to be described.

Figure 2:
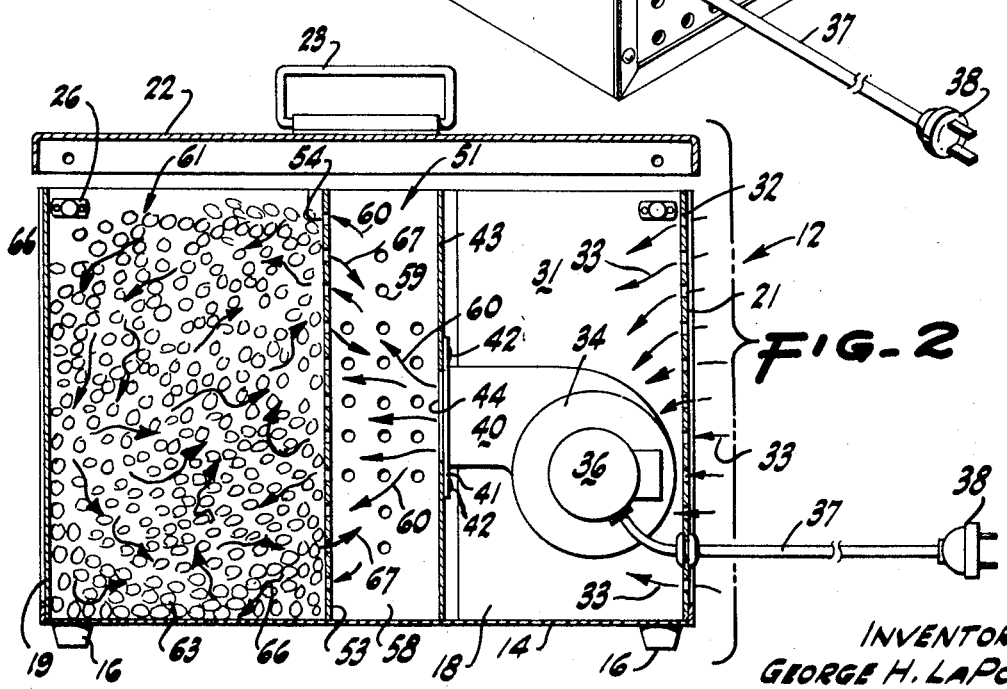
FIG. 2 is a sectional view, the plane of the section being indicated by the line 2—2 in FIG. 1.

Upon entering the air transfer compartment 51, the stale air assumes the approximate flow pattern indicated by the leftward headed arrows 60 (see FIG. 2).

Traversing the air transfer compartment, the stale air 60 passes through the perforations 54 in the transverse perforated wall 53 and enters the third compartment, termed an absorption chamber and designated by the reference numeral 61.

The absorption chamber 61 is so termed because it contains a charge of granular diatomaceous earth 63, a substance having the capability of absorbing, or absorbing, moisture, odors and the like.

Diatomaceous earth consists almost entirely of the silicious remains of minute flowerless aquatic plants known as diatoms. The principal constituent of diatomaceous earth is amorphous, or opaline silica which, if uncontaminated, ordinarily contains about 94 percent silica ($SiO_2$) and 6 percent combined water ($H_2O$) when thoroughly air dried. One of its unique physical properties is its great absorptive capacity, amounting to between 110 and 150 percent by weight. Furthermore, moderate heating can be utilized to renew the granular contents, thereby affording further economies, if desired.

As a result of the foregoing properties, the charge of diatomaceous earth 63 in the absorption chamber 61 is capable of removing substantially all moisture and stale, musty odors from the air 60 entering the absorption chamber 61 and circulating throughout the granules 63, FIG. the random fashion indicated by the arrows 66 in FIG. 2.

Thus, the portion of the random air flow pattern 66 emerging through the openings 54 from the absorption chamber 61, as designated by the arrows 67, is "fresh" and relatively devoid of moisture.

Some of the "fresh" air 67 entering the air transfer compartment 51 promptly proceeds to the nearest exit, namely, through the plurality of openings 59 in the lateral wall portions 57 and 58 of the air transfer compartment 51.

Other portions of the "fresh" air 67 emergent from the diatomaceous earth filled chamber comingle with the entering stale air 60, and the combination of stale and fresh air moves toward and passes outwardly through the openings 59 into the room within which the device is operating.

Still other fractions of the "fresh" air 67 combine with the incoming stale air 60 and are carried thereby backwardly through the perforations 54, for recirculation through the diatomaceous earth 63, and subsequently discharge 67 as "-fresh" air, as shown.

The size of the unit, and particularly the absorptive capacity of the diatomaceous earth charge, is selected so as to accommodate the environment to be treated. Room size, relative humidity, extent of mustiness, odor mildew and the like, are some of the factors to be taken into consideration; and experience will readily provide satisfactory determinations of unit size. In severe cases, more than one charge of diatomaceous earth may be advisable, as well as additional time of operation. In all but the most aggravated circumstances, however, the device is capable of transforming stale into "fresh" air within a relatively short period and of thereafter maintaining the desired condition with but a minimum of upkeep and attention.

It can therefore be seen that we have provided a convenient, compact, sturdy and efficient unit for the freshening and deodorizing of air.

What is claimed is:

1. A room freshener and deodorizer comprising:
    a. a housing including a bottom, a top, an imperforate end wall, a perforate opposite end wall, and a pair of sidewalls;

b. a perforate partition intermediate said end walls and forming with said imperforate end wall, said sidewalls and said top and bottom an absorption chamber, said absorption chamber containing granular diatomaceous earth, and said sidewalls and top and bottom defining said absorption chamber being each imperforate;

c. a mounting wall intermediate said perforate partition and said perforate end wall, said mounting wall having an air ingress opening and being spaced from said perforate partition to form with said sidewalls and said top and bottom an air transfer compartment, said sidewalls defining said air transfer compartment having air egress openings formed therein; and, d. a blower mechanism mounted on said mounting wall with its exhaust port in registry with and terminating at said ingress opening, said blower mechanism being located in an air intake compartment defined by said perforate end wall said sidewalls and said top and bottom and said mounting wall, said blower mechanism being effective to direct atmospheric air from said air intake compartment into said air transfer compartment, thence through said perforate partition for circulation through diatomaceous earth in said chamber, and return to said air transfer compartment for exhaust to the atmosphere through said air egress openings.

2. A room freshener and deodorizer as in claim 1 wherein said blower mechanism includes an electric motor adjacent one of said sidewalls defining said air intake compartment the last mentioned sidewall has a passageway formed therein adjacent said motor effective to guide atmospheric air therethrough into cooling contact with said motor.

3. A room freshener and deodorizer as in claim 2 wherein said top of said housing is removable to afford access to the diatomaceous earth chamber for removal and replacement of the diatomaceous earth when required.

4. A room freshener and deodorizer as in claim 3 wherein said top includes a handle and said housing is of a size such as to be readily portable by the average person.